Feb. 4, 1969 P. B. H. ROBINSON ET AL 3,425,701

SOUND REPRODUCING APPARATUS

Filed Sept. 7, 1965 Sheet 1 of 5

United States Patent Office 3,425,701
Patented Feb. 4, 1969

3,425,701
SOUND REPRODUCING APPARATUS
Paul Baron Henn Robinson, 26 Four Ashes Road, Bentley Heath, Knowle, and Anthony Alfred James Homer, 116 Dorridge Road, Dorridge, both of Solihull, England
Filed Sept. 7, 1965, Ser. No. 485,350
U.S. Cl. 274—9 17 Claims
Int. Cl. G11b 3/12

ABSTRACT OF THE DISCLOSURE

A record player arranged to operate in any position and incorporating a casing provided with a slot for the edgewise passage therethrough of a record disc, a pick-up and stylus contrained to move linearly along a radius of a record disc during playing, means for moving the stylus and the pick-up into and out of contact with a record disc, a spigot for centralizing a record disc in playing position, positively driven friction means for effecting a rotation of a record disc, and means for initiating a starting and stopping of the playing of the record.

This invention has reference to sound reproducing apparatus and is concerned particularly with sound reproducing apparatus for the playing of record discs, said apparatus being referred to hereinafter as record players.

The present invention has for its object to provide a record player which is readily transportable so as to be capable of being carried by one hand or slung from the shoulder and which allows a record disc to be played in any position in which the record player may be disposed.

Accordingly the invention consists of a record player incorporating a casing provided with an opening for the passage therethrough of a record disc, a "pick-up" constrained to move linearly along a radius of a record disc, means for moving the stylus of the "pick-up" into and out of contact with a record disc as and when required, means for centralising, maintaining and holding a record disc in the playing position, positively driven friction means for effecting a rotation of a record disc when so positioned and held and means for initiating a starting and stopping of the playing of a record as may be required.

The invention also resides in a record player constructed, arranged and adapted to operate substantially as will be described hereinafter.

Figure 1:
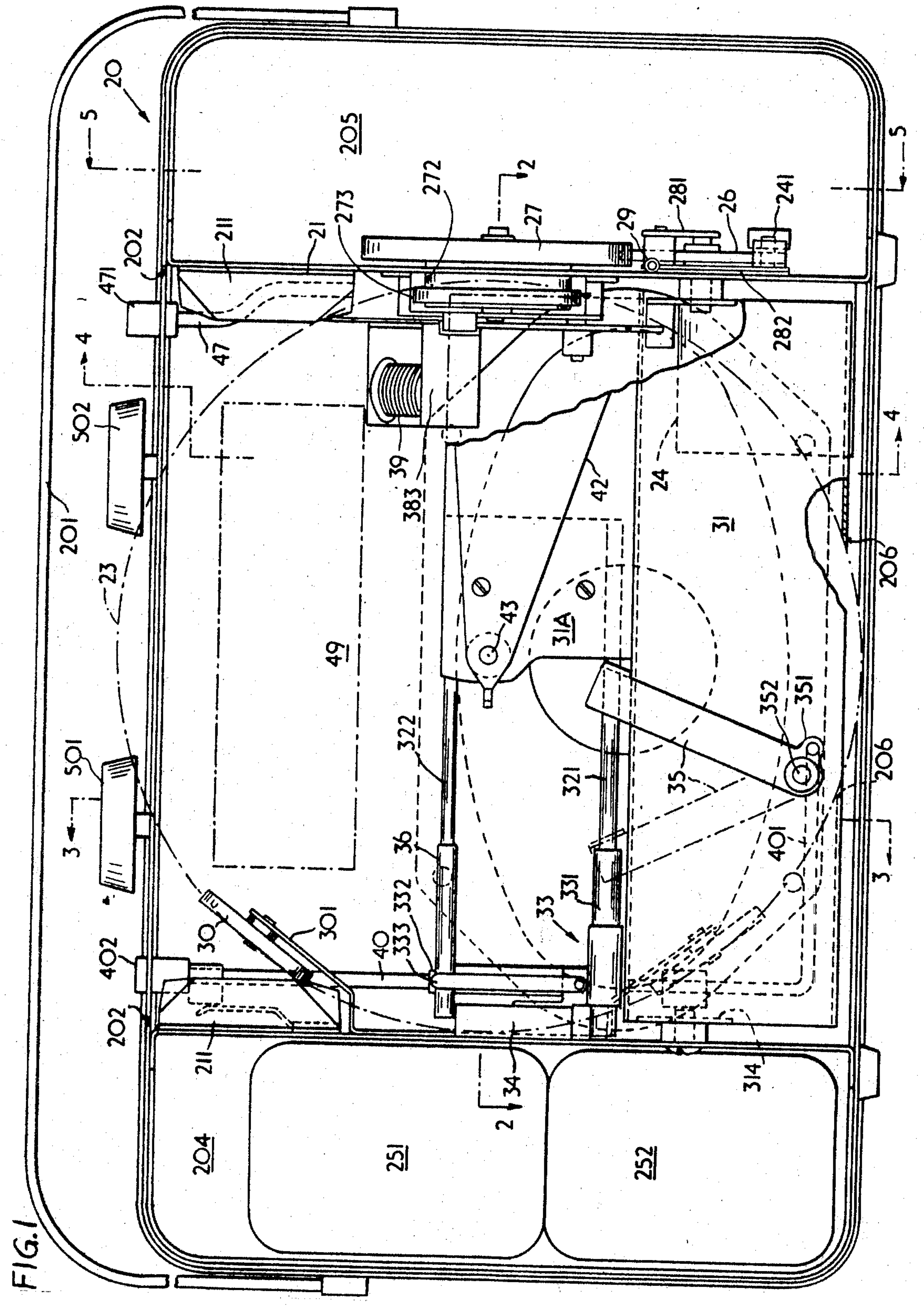
Figure 2:
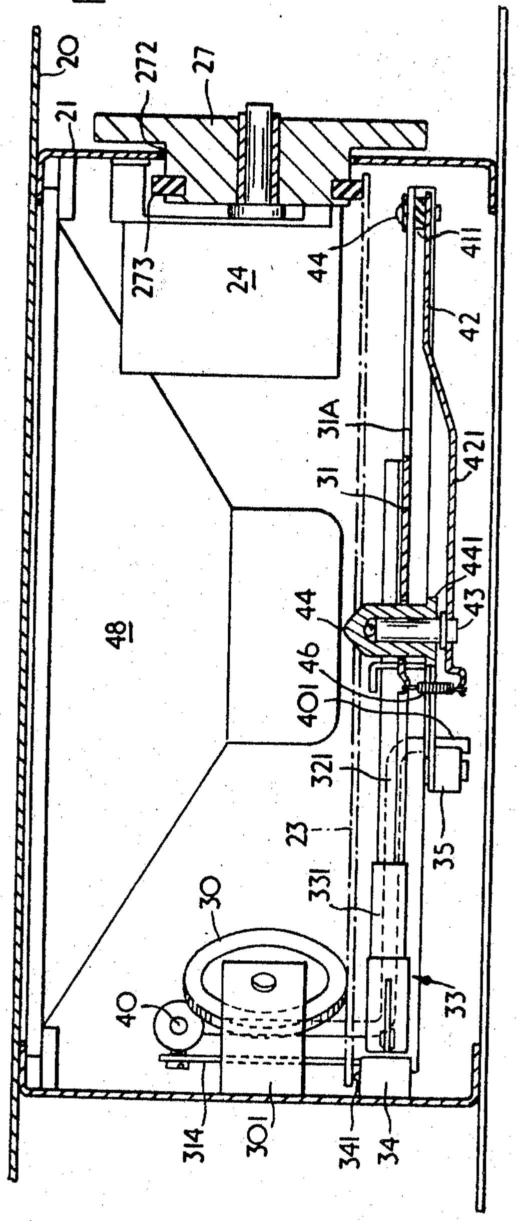
Figure 3:
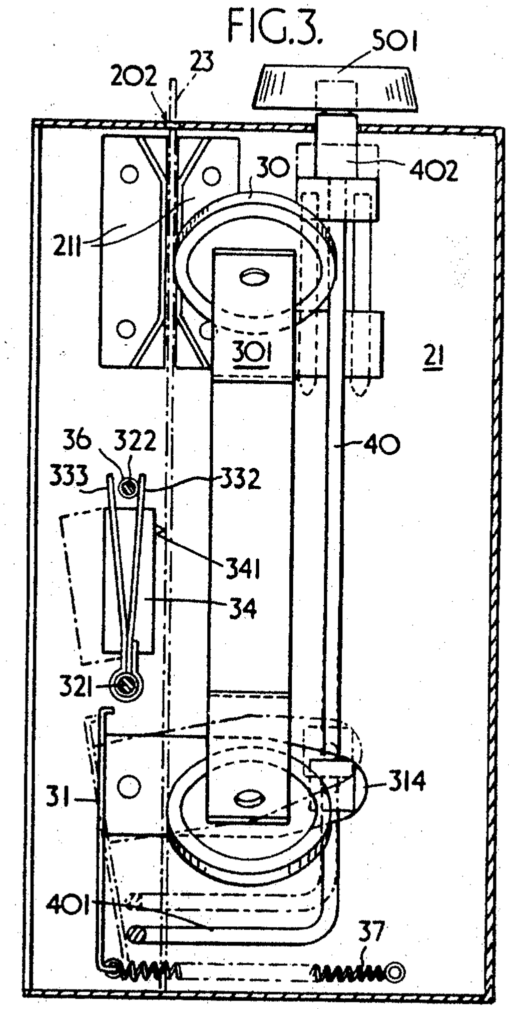
Figure 12:
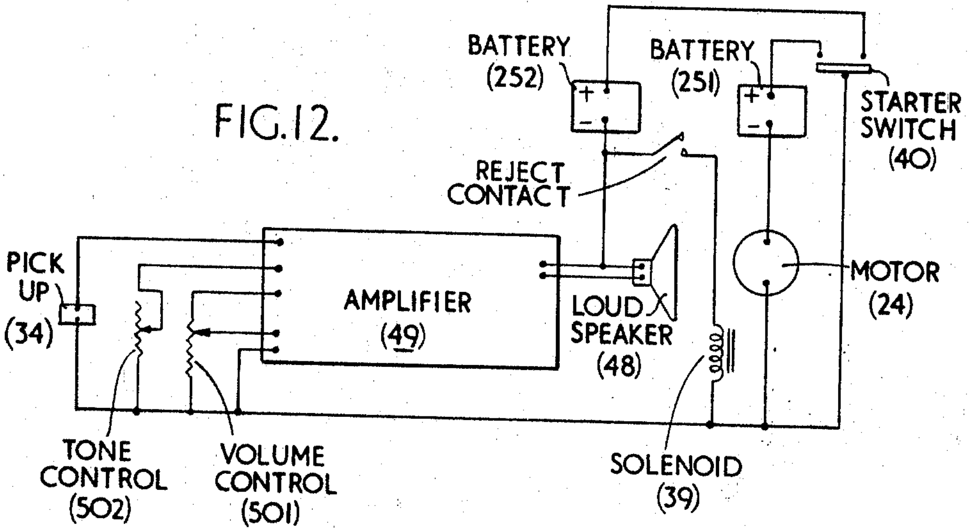
Figure 4:
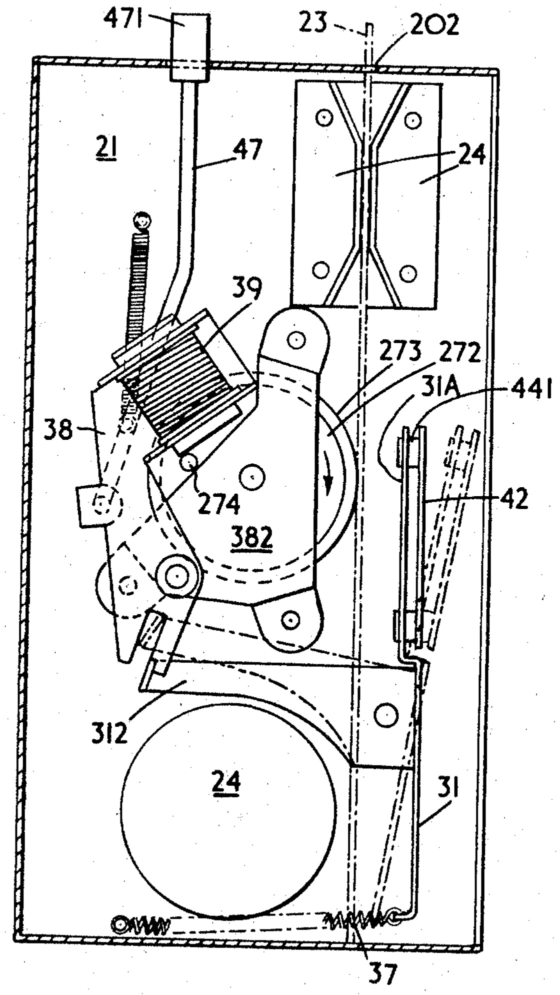
Figure 5:
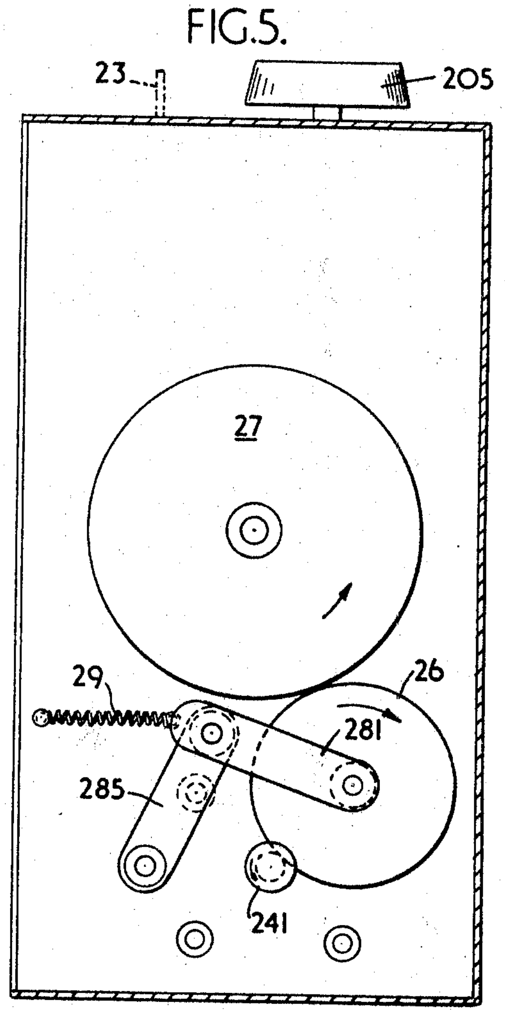
Figure 8:
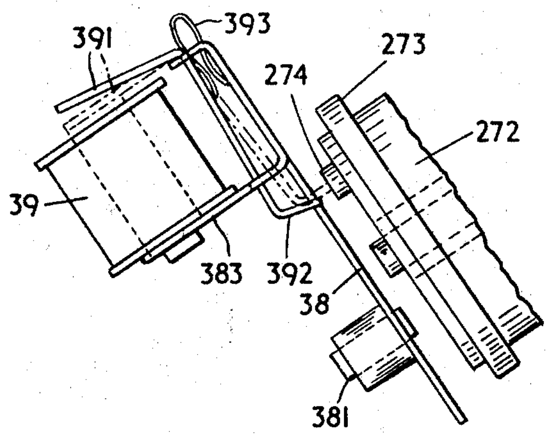
Figure 9:
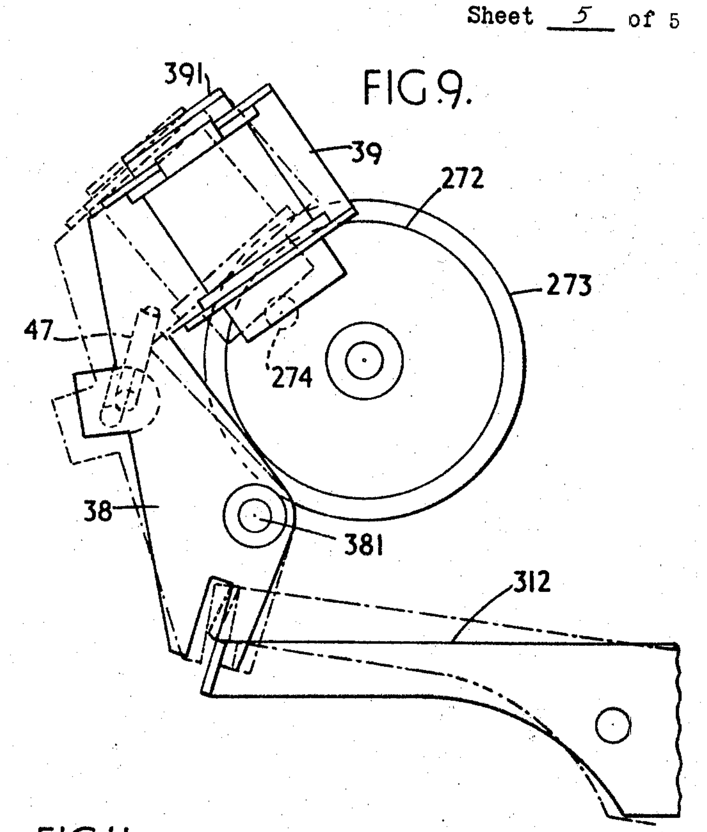
Figure 10:
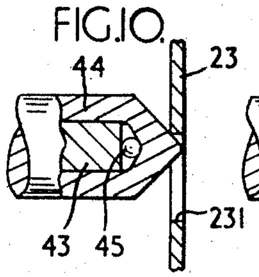
Figure 11:
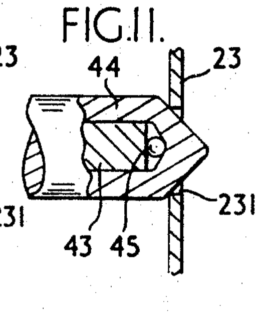
Figure 6:
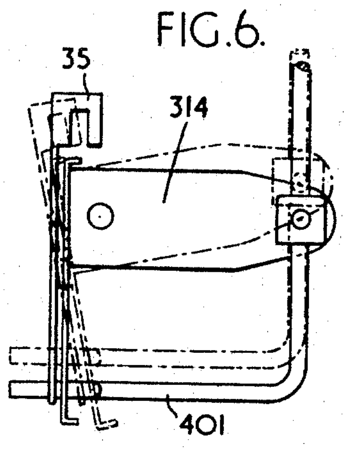
Figure 7:
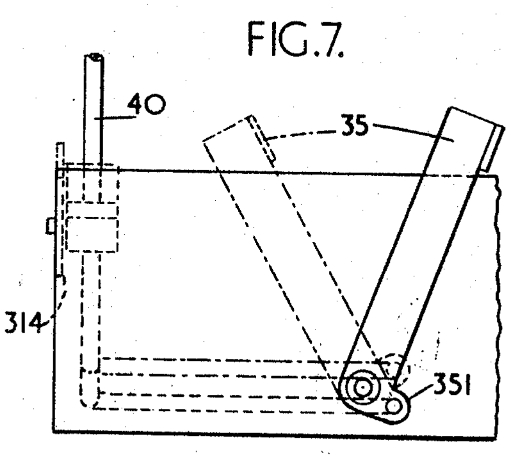

An embodiment of the invention will now be described with particular reference to the accompanying drawings wherein:

FIGURE 1 is a rear view of the record player as set for playing with the back of the casing removed and with parts omitted or broken away where desirable for the sake of clearness, FIGURE 2 is a longitudinal section taken on the plane indicated by the line 2—2 in FIGURE 1 looking in the direction of the arrows to the said line, FIGURE 3 is a vertical section taken on the plane indicated by the line 3—3 in FIGURE 1 looking in the direction of the arrows to the said line, FIGURE 4 is a vertical section taken on the plane indicated by the line 4—4 in FIGURE 1 looking in the direction of the arrows to the said line, FIGURE 5 is a vertical section taken on the plane indicated by the line 5—5 in FIGURE 1 looking in the direction of the arrows to the said line, FIGURE 6 is a fragmentary view illustrating the manner of tilting the carrier plate as illustrated in the said FIGURES 1 to 4, FIGURE 7 is a fragmentary view illustrating in detail the mounting of the reject arm, FIGURE 8 is a fragmentary view on an enlarged scale illustrative of the action of the latching and unlatching mechanism looking from the rear as viewed in FIGURE 1, FIGURE 9 is a fragmentary view also on an enlarged scale illustrative of the action of the latching and unlatching mechanism looking in the same direction as the arrows to the line 5—5 in FIGURE 1, FIGURES 10 and 11 are fragmentary views on an enlarged scale illustrative of the action of the spigot on which the record is mounted during playing, and FIGURE 12 is an electric circuit diagram.

In the drawings parts are omitted where desirable for the sake of clearness and like numerals of reference are used for denoting similar parts in the several views.

According to the illustrated embodiment of the invention the record player incorporates a casing which conveniently is formed in three parts as pressings of light metal or metal alloy only the central portion being shown in the drawings and being designated by the reference numeral 20 and being referred to as the casing 20. The casing 20 conveniently is fitted with a handle strap 201 so that the record player may be carried by the said handle strap 201. If desired a sling may be substituted for the handle strap 201 so that the record player may be slung from the shoulder of the user.

The casing 20 is provided with a slot 202 in the top of the assembled casing of a length which permits of the insertion therethrough of record discs, conveniently the standard 7" record disc.

Mounted in the casing 20 is a sheet metal chassis 21 incorporating at each end resilient guide members 211 for guiding a record disc 23 into the playing position.

Mounted in one end of the bottom of the chassis 21 is an electric motor 24 which is adapted to derive electrical energy from one of a pair of electrical dry storage batteries 251, 252 of a standardised voltage and capacity, namely the battery designated by the reference numeral 251 in FIGURE 1, which are adapted to be housed with a compartment 204 at one end of the casing 20.

One end of the rotor shaft 241 projects into a compartment 205 at the opposite end of the casing 20 to the compartment 204 within which the batteries 251, 252 are housed and the periphery of this projecting end portion of the rotor shaft 241 is in frictional driving contact with the periphery of an intermediate friction wheel 25 the periphery of which in turn is in frictional contact with the periphery of a flywheel 27. The intermediate friction wheel 26 is maintained in frictional contact with the periphery of the rotor shaft 241 and with the periphery of the flywheel 27 through the agency of a pair of pivotally mounted links 281, 282 in conjunction with a coil spring 29.

The flywheel 27 is rotatably mounted on an axle 271 supported from the adjacent end of the chassis 21.

The flywheel 27 is formed with an integral boss 272 which is located on the inside of the wall of the chassis 21 adjacent to the said flywheel 27 and which boss 272 is provided with a rubber tyre 273 which is adapted to contact the inner face of the record 23 when in position for playing as is clearly indicated in FIGURE 2.

At the opposite end of the chassis 21 to that at which the flywheel 27 and rubber-tyred boss 272 are disposed is a pair of inclined rubber-tyred guide wheels 30 which are rotatably supported by brackets 301 fixed to the chassis 21 and which are adapted to engage the same side of the record disc 23 as the rubber tyre 273 of the boss 272, see FIGURE 3.

The record disc 23 to be played is inserted through the slot 202 in the top of the casing 20 and upon insertion the record disc 23 falls until the lower portion of the periphery thereof rests on steps 206 in the bottom of the chassis 20, see FIGURE 1.

Hingedly mounted within the chassis 21 is a carrier plate 31 which is provided with a pair of parallel rods 321, 322 on the lowermost of which namely that designated 321 is slidably mounted an assembly which will be termed hereinafter the carriage and which is designated generically by the reference numeral 33.

The pair of parallel rods 321, 322 are of metal of good electrical conductivity and are arranged on either side of the location of the centre of a record disc 23 when occupying the playing position, see FIGURE 1.

Associated with the carriage 33 is a pick-up cartridge 34 of conventional construction.

The hinged carrier plate 31 aforesaid is capable of being tilted so as to bring the stylus 341 of the pick-up cartridge 34 into contact with a record disc 23 when in the playing position and to remove the stylus 341 from such a position automatically after the completion of a playing or as required for other reasons such for example as the discontinuance of a playing preparatory to the substitution of another record disc 23.

The carriage 33 incorporates a sleeve 331 of a synthetic plastics material having a low co-efficient of friction which is adapted to slide on the rod 321 aforesaid and to cooperate with an arm 35 hereinafter termed the reject arm 35 as and for a purpose to be described hereinafter.

Mounted on the outer end portion of the other rod 322 is a sleeve 36 of a synthetic plastics material of poor electrical conductivity and low coefficient of friction.

The carriage 33 has associated therewith a pair of upstanding oppositely disposed strips 332, 333 the innermost of which namely that designated 332 is resilient and tends to remain in bearing contact with the sleeve 36 or with the rod 322 on which the sleeve 36 is mounted whilst the other strip namely that designated 333 comes into action to remove the stylus 341 of the pick-up carriage 34 from the playing position when so required. The reject arm 35 is associated with spring means 37 which tends to retain the carrier plate 31 in the out of action position and which spring means 37 is stressed during tilting of the carrier plate to the playing position and the consequent setting of the said reject arm 35 to the playing position, see full line positions in FIGURES 1 and 7 so that after setting the spring means 37 tends to return the reject arm 35 to the start position, see dotted line position FIGURE 7.

The hinged carrier plate 31 is provided with a latch arm 312 which co-operates with a pivotally mounted complementary catch lever 38 to latch the hinged carrier plate 31 when tilted into the playing position, see FIGURES 1, 4, 8 and 9 said catch lever 38 being turnable about a pivot pin 381 supported from a bracket 382 secured to the presented end of the chassis 21.

The rod 322 is included in the electrical circuit, see FIGURE 12, through a solenoid 39 the armature whereof is associated with the catch lever 38.

The solenoid 39 is mounted on a bracket 383 formed integral with the catch lever 38 and the armature 391 associated with the solenoid 39 carries a tail 392 which can be projected into the path of a peg 274 on the boss 272 associated with the flywheel 27.

The tail 392 aforesaid is adapted to be struck by the said peg 274 for tripping the latch arm 312 as and when required and for a purpose to be set forth hereinafter.

Normally the tail 392 is maintained in the out of action position by a light hairpin spring 393.

The hinged carrier plate 31 is adapted to be tilted into the record playing position by manipulating a push rod 40 which also serves as a "start" switch, see FIGURE 12, and which has a pivotal connection in its lower portion to the outer end of a crank arm 314 projecting from the adjacent end of the hinged carrier plate 31. The push rod 40 is also formed with a cranked length 401 the free end of which is connected with a crank 351 adjacent to the pivot 352 of the reject arm 35.

The upper end of the push rod 40 projects through a hole in the top of the casing 20 and has a knob 402 fixed on the projecting end thereof.

Secured to an extension 31A of the hinged carrier plate 31 at at one end thereof through the medium of screws 41 and rubber spacer grommets 411 is a triangular plate 42 which is cranked so that the outermost portion 421 thereof is spaced from the extension 31*a*.

Fixed to the triangular plate 42 hereinafter termed the spring plate 42 is a pin 43 the inner end portion of which is engaged within the bore of a conically nosed spigot 44. The nose portion of the spigot 44 is adapted to project through a hole 315 in the extension 31A, a boss or flange 441 on the spigot preventing the spigot 44 from being projected completely through the said hole 315. A bearing ball 45 is inserted in the end of the bore of the spigot 44 so as to constitute an anti-friction bearing between the pin 43 and the spigot 44.

The axis of the pin 43 and of the conically nosed spigot 44 is located in the same vertical plane as the centre of the customary central hole 231 in the record disc 23 when seated on the steps 206 aforesaid.

The wider portions of the conical nose of the spigot 44 are of greater diameters than the diameter of the central hole 231 in the record disc 23.

The extension 31A and the spring plate 42 are interconnected by a light spring 46 which tends to urge the spigot 44 inwardly for a purpose to be set forth hereinafter.

Pivotally connected to the catch lever 38 adjacent to the pivot 381 is the lower end of a release rod 47 the upper end of which projects through a hole in the top of the casing 20 and has a knob 471 fixed thereon.

The chassis 21 also carries a loundspeaker unit 48 and an amplifier unit 49 both of conventional construction. The said loudspeaker unit 48 and amplifier unit 49 derive their current from the dry electric storage battery 252 (see FIGURE 12).

Mounted on top of the casing 20 are rotatable knobs 501, 502 respectively for controlling the volume of and the tone of the sound emitted from the loudspeaker unit 48.

The record player is adapted to be used in the following manner.

Assuming that the carrier plate 31 is in the out of action position the record disc 23 to be played is inserted through the slot 202 in the top of the casing 20 until the lower end thereof rests on the steps 206 of the chassis 21. The rod 40 which serves as the start switch is then depressed thereby occasioning the starting of the electric motor 24 and the tilting of the carrier plate 31 toward the inserted record disc 23. The tilting of the carrier plate 31 toward the record disc 23 initially causes the end of the nose of the spigot 44 to enter the top portion of the central hole 231 in the record disc 23 firstly to occasion a lifting of the record disc 23 so that further tilting of the carrier plate 31 pushes the nose of the spigot 44 further into the hole 231 to centralise the record disc 23 on the spigot 44 and to cause the nose of the spigot 44 to fill completely the said hole 231 and to apply pressure to the central portion of the record disc 23 so that the record disc 23 becomes pinched between the nose of the spigot 44 on the one side and the tyre 273 and guide wheels 30 on the other side thereby occasioning a rotation of the record disc 23.

The tilting movement of the carrier plate 31 causes the stylus 341 of the pick-up cartridge 34 to engage the sound grooves of the now rotating record disc 23. At the same time the latch arm 312 co-operates with the catch lever 38 to latch the carrier plate 31 in the playing position.

Concurrently the reject arm 35 is moved towards the centre of the record disc 23. Playing then proceeds with the sleeve 331 associated with the carriage 33 and the pick-up cartridge 34 moving inwardly along the rod 321.

At the same time the strip 332 rides along the sleeve 36 on the outer end portion of the rod 322.

As the stylus 341 rides out of the "run off" groove in the record disc 23 the strip 332 contacts the uncovered portion of the upper rod 322 and thereby occasions the completion of the electric circuit through the solenoid 39.

The energising of the solenoid 39 causes the tail 392 of the armature 391 to be projected into an obstructing position relatively to the peg 274 on the boss 272. Subsequently on further rotation of the flywheel 27 the peg 274 on the boss 272 strikes the tail 392 and causes the catch lever 38 to turn on its pivot pin 381 and to trip the latch arm 312 so that the carrier plate 31 returns to the out of action position under the influence of the spring means 37 and so draws the stylus 341 out of contact with the record disc 23.

Concurrently the now freed reject arm 35 bears on the sleeve 331 and moves the carriage 33 to the start playing position. The movement of the carrier plate 31 into the out of action position involves stoppage of the electric motor 24 and the withdrawal of the spigot 44 from within the central hole 231 in the played record disc 23 so that the said played record disc 23 may then be removed and either reversed or another record disc substituted therefor as may be required.

If desired the stoppage of the playing of a record disc 23 may be effected at any stage by manipulation of the manually operable release rod 47.

Stoppage of playing whether effected automatically or arbitrarily occasions the resetting of the starting switch rod 40 and of the release rod 47, the resetting of the starting switch rod 40 also occasioning the stoppage of the electric motor 24.

It will be appreciated that as a record disc being played is positively pinched between the friction driving wheel and the spigot 44 during rotation and that as the stylus 341 is maintained in contact with the record disc 23 under light pressure and is constrained to move on a definite linear path that the record player can be used when carried by the hand or slung from the shoulder by the user or disposed in any other position.

Furthermore it will be appreciated that the playing of a record disc may be stopped at any stage at the will of the user or is stopped automatically at the conclusion of the playing of a record disc.

It may be mentioned that the making of provision for the storage within the case of the record player of electric storage batteries of standardised voltage and capacity results in a record player as hereinbefore described constituting a self-sufficient unitary apparatus.

We claim:

1. A record player incorporating a casing provided with a slot for the edgewise passage therethrough of a record disc, a pick-up and stylus constrained to move linearly along a radius of a record disc during playing, means for moving the stylus of the pick-up into and out of contact with a record disc as and when required, a conical spigot for centralizing, maintaining and holding a record disc in the playing position by entering a conventional center hole therein and supporting said record disc thereby, an electric motor, positively driven friction means driven from said electric motor, for effecting by direct engagement with the periphery of said record disc a rotation of said record disc when so positioned and held, and means for initiating a starting and a stopping of the playing of a record as may be required.

2. A record player incorporating a casing provided with an opening for the passage therethrough of a record disc, carrier means tiltably mounted within the casing, a rod carried by and tiltable with said carrier means which is arranged parallel to a diameter which passes through the centre of the record disc being played during playing, a carriage slidably mounted on said rod, a pick-up associated with said carriage and incorporating a stylus which can be moved into and out of contact with a record disc by the tilting of the carrier means in one or other direction and which is constrained by reason of the manner of mounting the carriage to move linearly along a radius of a record disc during playing, manually operable means for tilting the carrier means so that the stylus is moved into contact with the record disc for playing purposes, means for latching the carrier means with the stylus in the playing position as required, spring means which serves to return the carrier means to the out of action position subsequent to the unlatching of the said carrier means, a friction driving means located on the opposite side to the side of the record disc being played, an electric driving motor, transmission means for transmitting the drive from the electric motor to the friction driving means aforesaid, a spigot carried by and tiltable with the carrier means and arranged so that when the carrier means it tilted into the playing position the spigot initially will engage within the conventional centre hole in the record disc and lift the record disc and effect a centralisation thereof on the spigot and subsequently will fill the said centre hole and apply pressure to the record disc so that the record disc becomes pinched between the spigot and the friction driving means whereby the record disc may be positively rotated, electro-mechanical means governed by the traverse of the carriage for effecting automatically unlatching of the carriage at the completion of the playing of a record disc and means brought into action automatically on the unlatching of the carrier means to effect the return of the pick-up and stylus carried thereby to the "start" position and manually operable control means for bringing the electric motor into operation preparatory to the playing of a record and for tilting the carrier means into the playing position.

3. A record player as claimed in claim 2 in which guide means are provided on the same side of a record disc being played as the friction driving means aforesaid but which are disposed on the other side of the centre of the record disc to that on which the friction driving means is located whereby when pressure is applied on the playing side of a record disc the record disc being played is moved into and held in firm contact with the friction means and the said guide means.

4. A record player as claimed in claim 2 in which the casing is provided with means for supporting the record disc after insertion through the opening preparatory to the initiation of playing.

5. A record player as claimed in claim 2, incorporating pressure applying means in the form of a conically nosed spigot the conical nose whereof can be caused to be inserted in the central hole in a record disc to be played, firstly to occasion the lifting of the record disc off the supporting means aforesaid and the centralising of the record disc on the spigot and subsequently to fill the said central hole to apply pressure to the central portion of the record disc and so cause the periphery of the record disc to be moved into driving contact with the positively driven friction means and guide means.

6. A record player as claimed in claim 2 in which resilient means is associated with the spigot for assisting in applying pressure to the central portion of the record disc being played.

7. A record player as claimed in claim 2 in which the spigot is provided with a central bore within which is engaged a pin fixed to a spring plate which in turn is fixed to the carrier means the spring plate being so mounted relatively to the carrier means as to exert a pressure on the said pin and through the said pin on the conical nosed spigot so that when the spigot is in the playing position the spring plate causes the said spigot to apply pressure to the central portion of the record disc being played.

8. A record player as claimed in claim 2 in which a pin is affixed to a spring plate which in turn is fixed to the carrier means and anti-friction means is inserted between the end of the pin and the end of the bore in the spigot.

9. A record player as claimed in claim 2 in which the spigot is conically nosed and is provided with a flange which prevents complete displacement of the spigot relatively to the carrier means.

10. A record player as claimed in claim 2 in which the spring plate is secured to the carrier means and in which resilient grommets are inserted between the spring plate and the carrier means from which the said spring plate is supported.

11. A record player as claimed in claim 2 in which a second rod is provided which is arranged parallel to the rod on which the carriage is traversably mounted but which is arranged on the opposite side of a diameter passing through the centre of the record disc when in the playing position to that of the rod on which the carriage is mounted and in which the said second rod is made of metal of good electrical conductivity and is included in an electrical circuit including electro-mechanical means for effecting the automatic release of the tiltable carrier means from the playing position subsequent to the completion of the playing of a record disc.

12. A record player as claimed in claim 2 in which a second rod opposite to that on which the carriage is mounted is provided on the outer portion with a sleeve of a material of poor electrical conductivity and low coefficient of friction so that an electrical contact-making member in slidable contact therewith and which is traversable with the carriage is electrically insulated until the stylus rides into and completes its run in the run off groove of a record disc upon the completion of a playing whereupon an electrical circuit is made and the electro-mechanical means aforesaid caused to be brought into action.

13. A record player as claimed in claim 2 in which the tiltable carrier means is provided with a latch arm and in which a pivotal catch lever is provided which tends to become engaged in latching relationship with the said latch arm whenever the carrier means is tilted into the playing position and in which the catch lever carries a solenoid which is caused to be energized at the completion of a playing and in which the solenoid has assocated therewith an armature having a projection which is caused to be moved into the path of a projection on a rotatable member which is driven from the electric motor when a playing is proceeding and in which when the armature comes into an obstructing position relatively to the projection on the said rotatable member the catch lever is caused automatically to unlatch itself from the latching arm aforesaid.

14. A record player as claimed in claim 2 in which the tilting of the carrier means and the starting of the electric motor is effected through the medium of a push rod which serves as a "start" switch and which has a pivotal connection to a crank arm carried by the carrier means for effecting the tilting of the carrier means and with contact making and breaking means controlling the circuit through the electric motor so that depression of the control rod occasions a starting of the electric motor and the tilting of the carrier means into the playing position and the consequential latching of the tiltable carrier means in the playing position.

15. A record player as claimed in claim 2 in which the carriage is associated with a pivotal reject arm the free end of which is caused to be moved towards the centre of the record disc being played on the initiation of playing and which reject arm on unlatching of the tiltable carrier means is caused to move into contact with the carriage and to urge the carriage to the start position under the influence of spring means.

16. A record player as claimed in claim 2 in which a catch lever has connection with a control rod which can be manually operated to cause the said catch lever to become unlatched from the latch arm for the carrier means wherever it is desired arbitrarily to discontinue the playing of a record disc.

17. A record player as claimed in claim 2 which is contained within a casing in which is stowable storage batteries so that the record player constitutes a self-sufficient unitary apparatus.

References Cited

UNITED STATES PATENTS 2,943,861 7/1960 Redfield ------------ 274—9.2
2,391,784 12/1945 Johnston ------------- 274—9
2,219,230 10/1940 Krause --------------- 274—2

LEONARD FORMAN, *Primary Examiner.*

U.S. Cl. X.R.

274—39.1, 15